United States Patent

Koehler et al.

[11] Patent Number: 5,149,360
[45] Date of Patent: Sep. 22, 1992

[54] LIQUID LAYDOWN PROCESS AND METAL FILTER

[75] Inventors: Paul C. Koehler; Stephen A. Geibel; Michael B. Whitlock, all of Cortland, N.Y.

[73] Assignee: Pall Corporation, Glen Cove, N.Y.

[21] Appl. No.: 836,381

[22] Filed: Feb. 18, 1992

Related U.S. Application Data

[63] Continuation of Ser. No. 598,954, Oct. 17, 1990, abandoned, which is a continuation-in-part of Ser. No. 492,409, Mar. 8, 1990, abandoned, which is a continuation of Ser. No. 386,123, Jul. 28, 1989, abandoned.

[51] Int. Cl.⁵ .............................. G22F 1/00
[52] U.S. Cl. ............................ 75/228; 119/23; 119/36; 119/39; 119/48
[58] Field of Search .......... 419/2, 39, 48, 23, 36; 75/228

[56] References Cited

U.S. PATENT DOCUMENTS

| | | | |
|---|---|---|---|
| 1,922,038 | 7/1938 | Hardy | 75/45 |
| 2,157,596 | 5/1939 | Davis | 75/22 |
| 2,554,343 | 5/1951 | Pall | 210/205 |
| 2,721,378 | 10/1955 | Oliver et al. | 29/420 |
| 2,826,805 | 3/1958 | Probst et al. | 29/182 |
| 2,968,405 | 1/1961 | Veres | 210/469 |
| 3,158,532 | 11/1964 | Pall et al. | 162/103 |
| 3,287,112 | 11/1966 | Blaha | 75/222 |
| 3,313,621 | 4/1967 | Mott | 75/212 |
| 4,186,100 | 1/1980 | Mott | 210/496 |
| 4,435,483 | 3/1984 | Ahslund et al. | 428/566 |
| 4,562,039 | 12/1985 | Koehler | 419/2 |
| 4,613,369 | 9/1986 | Koehler | 75/246 |
| 4,702,947 | 10/1987 | Pall et al. | 428/36 |
| 4,707,184 | 11/1987 | Hashiguchi et al. | 75/228 |
| 4,822,692 | 4/1989 | Koehler | 428/547 |
| 4,828,930 | 5/1989 | Koehler | 428/547 |
| 4,847,045 | 6/1989 | Kemp, Jr. et al. | 419/36 |

FOREIGN PATENT DOCUMENTS

| | | |
|---|---|---|
| 20804 | 12/1976 | Australia . |
| 0057848 | 8/1982 | European Pat. Off. . |
| 1194268 | 11/1959 | France . |
| 577765 | 5/1946 | United Kingdom . |
| 710838 | 6/1954 | United Kingdom . |

Primary Examiner—Stephen J. Lechert, Jr.
Attorney, Agent, or Firm—Leydig, Voit & Mayer

[57] ABSTRACT

Metal filter sheet is made by a method in which metal particulates are suspended in a fluid medium containing a stabilizing agent. The stable suspension is then filtered to leave a wet cake of the metal particulate which is then dried, compressed, and sintered to produce the metal filter sheet.

33 Claims, 1 Drawing Sheet

LIQUID LAYDOWN PROCESS AND METAL FILTER

This application is a continuation of application Ser. No. 07/598,954, filed Oct. 17, 1990, now abandoned, which is a continuation-in-part of application Ser. No. 07/492,409, filed Mar. 8, 1990, now abandoned, which is a continuation of application Ser. No. 07/386,123, filed Jul. 28, 1989, now abandoned.

TECHNICAL FIELD

This invention relates to porous metal articles and more particularly to a method of making sintered metal particulate filters.

BACKGROUND TO THE INVENTION

Metal filters have long been used for a variety of applications. For example, porous stainless steel filters prepared from sintered metal particulate, e.g., stainless steel powder, have been used in a variety of processes where high pressure drops are acceptable and in applications where relatively fine filtration capability must be combined with mechanical strength, resistance to high temperatures, and/or resistance to chemical attack. Such applications include the filtration of fine catalysts used in fluidized bed catalytic processes where elevated temperatures are encountered, e.g., fluid catalytic cracking processes, and in the manufacture of high fidelity recording tapes.

Still another use of such filters is in the filtration of molten resin used in the manufacture of polymeric films and fibers as, for example, polyester film.

Conventional sintered metal media suffer from variations in density in the process of laying the powder down prior to sintering. The present invention provides a method of powder laydown that results in very uniform filter performance.

In addition to a highly uniform filter performance, it is found that the products made by the process of the invention show a significant increase in efficiency and dirt holding capacity.

DISCLOSURE OF THE INVENTION

The present invention provides a method of making a porous metal filter medium which comprises (a) forming a stabilized suspension of a metal particulate in a fluid medium; (b) pressure filtering the stabilized suspension through a screen that is fine enough to retain substantially all the particles, so as to form a wet cake; (c) drying said wet cake to remove water and provide a dried cake with green strength; (d) compressing the dried cake to a predetermined thickness; and (e) sintering the compressed dried cake to fuse the metal particles and remove all volatile material leaving a filter medium with a uniform pore structure.

The invention also provides a porous metal sheet of substantially uniform pore structure comprising a non-spherical metal particulate in which the individual particles of the particulate are bonded to each other and the sheet has a Bubble Point ratio of about 1.2 or less at a flow rate of about 60,000 cc/min/ft$^2$ (1.0 ft$^2$ = 0.093 m$^2$) and a nominal surface area of about 0.3 ft$^2$ (279 cm$^2$) or greater, e.g., a disc of about 7.5 inches (19.1 cm) in diameter.

The filter sheet has a uniform pore structure and this is understood to refer to the pore structure in any specific layer or horizontal cross-section of the filter. It is in fact often preferred to have a porosity that is graded from one face of the filter to the opposed face in the direction of filtration. Nevertheless, at any specific cross-section perpendicular to the direction of filtration, the filter has a substantially uniform porosity.

The stabilized suspension used to prepare the porous metal sheets in accordance with the invention is comprised of a liquid medium, the metal particulate, a stabilizing agent, and a binding agent. Preferably a single constituent serves to both stabilize the dispersion of metal particulate and, upon drying of the suspension, bind the individual particles to each other and provide thereby the requisite green or unsintered strength.

Typically, the stabilized suspension of the metal particulate and the liquid medium is prepared by the following general procedure.

The stabilizing/binding agent is combined with a liquid medium, preferably water for ease of use and disposal, in an amount such as to provide the requisite concentration of the stabilizing/binding agent in the liquid medium. The combination is mixed until uniform dispersion of the stabilizing/binding agent is obtained. The requisite amount of metal particulate material is then added and mixed to provide a uniform dispersion or suspension of the metal particulate in the liquid medium.

For some systems, this is all that is required. The suspension of metal particulate in the liquid medium containing the stabilizing/binding agent is stable after a thorough mixing has been completed. By "stable" or "stabilized" is meant that the metal particulate material is in suspension such that it will not settle out at a rate that would lead to non-uniform deposition during the filtration.

"Pressure filtration" of the above suspension implies that there is an imposed pressure gradient across the filter device. This may be by a pressure increase above the filter medium, by a reduction in pressure below the filter or a combination of both.

The wet cake is dried until it has a green strength that will allow it to be handled and manipulated in the further stages without being damaged.

DESCRIPTION OF PREFERRED EMBODIMENTS

Figure 1:
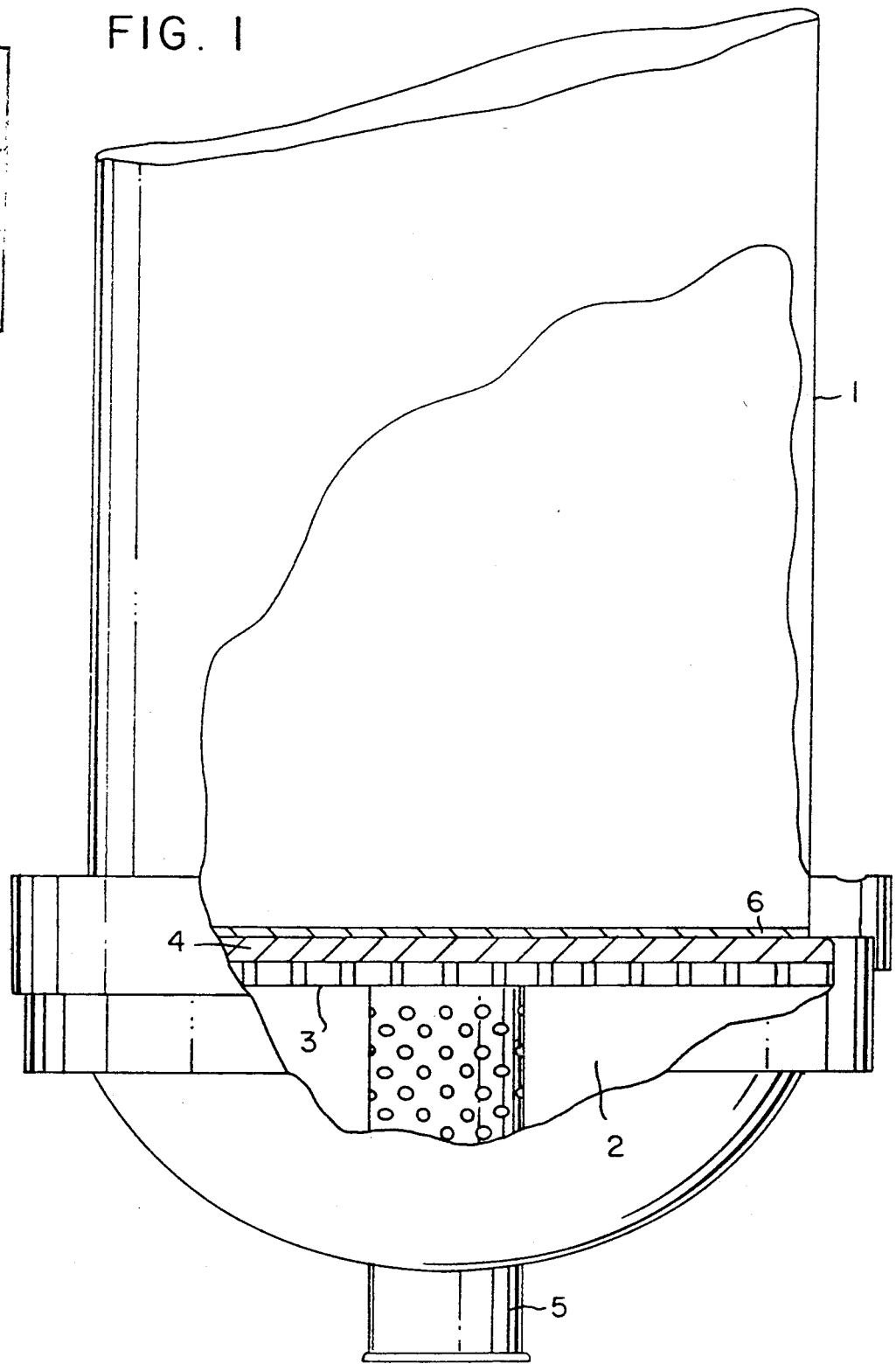
FIG. 1 is a side elevation partly in cross-section of a filter device useful in the pressure filtration operation that forms part of the method of making a porous metal filter according to the invention.

The invention is now further described in terms of the preferred means of carrying it into effect. To facilitate this analysis, the process is subdivided into its five component suboperations: forming the suspension; filtering; production of dried cake; compression of dried cake; and sintering to produce the final filter medium.

Stabilized Suspension

The medium in which the metal particulate is suspended is most conveniently water-based but other liquids such as, for example, an alcohol or a light oil can be used if desired, provided that the resulting suspension can be readily filtered. The metal particulate can be formed from any of a variety of metal materials including alloys, various metals, such as nickel, chromium, copper, molybdenum, tungsten, zinc, tin, gold, silver, platinum, aluminum, cobalt, iron, and magnesium, as well as combinations of metals and metal alloys, including boron-containing alloys. Nickel/chromium alloys are preferred. Of these, the AISI designated stainless steels, which contain nickel, chromium, and iron, are most preferred. Particularly preferred are the AISI 300 series of stainless steels, commonly referred to as the austenitic stainless steels. Other stainless steels within the preferred class are the martensitic stainless steels, maraging steels, 17-7 and 17-4 PH stainless steels, ferritic stainless steels, and Carpenter no. 20 alloy. Other alloys within the preferred class of nickel/chromium alloys are the Hastelloys, the Monels, and the Inconels, as well as 50 weight percent nickel/50 weight percent chromium alloy. Multistructured materials, such as duplexes of ferritic and austenitic stainless steels may also be used.

The metal particulate used in the method of this invention may have various shapes, including dendritic, acicular, and spherical, and will typically have nominal particle sizes in the range of from about 1 to about 300 $\mu$m, preferably from about 1 to about 150 $\mu$m, more preferably from about 1 to about 75 $\mu$m, and most preferably from about 1 to about 40 $\mu$m. The size of the metal particulate chosen for a particular combination is related to the desired porosity of the final product. For a finer filter, nominal particle sizes of from about 1 to about 75 $\mu$m, and preferably from about 1 to about 40 $\mu$m, are suitable, but for coarser filters, nominal particle sizes of from about 100 to about 300 $\mu$m are preferably used.

The weight ratio of the metal particulate to the liquid medium will typically be in the range of from about 4.0:1 to about 0.1:1, preferably from about 1:1 to about 0.025:1.

Typically, the stabilizing/binding agent used will be present in the liquid medium in an amount of about 0.1 to about 5 weight percent, more preferably from about 0.2 to about 1 weight percent (based on the weight of the liquid and the stabilizing/binding agent). The ratio of the stabilizing/binding agent to the weight of particulate should be as low as possible to limit the carbon content introduced into the structure prior to sintering. This is particularly important with austenitic stainless steel.

For many applications it is preferred to add an additional component to set up the stabilizing/binding agent. For example, with a polyacrylic acid stabilizing/binding agent in water, the addition of a neutralizing base, such as ammonium hydroxide, serves to neutralize the polyacrylic acid and increase the viscosity substantially, for example, to about 10,000 to about 50,000 centipoise (cp). Such systems are very thixotropic, i.e., they have a very high apparent viscosity when undisturbed (low shear condition) and hence settling of the suspended particulate is retarded. When vigorously agitated, however, they have a very low effective viscosity and, hence, are very effective in dispersing the metal particulate. Since these suspensions are very stable, they may be prepared in advance of the time they are used without significant settling out of the metal particulate. Alternatively, however, other stabilizing/binding agents may also be used which do not require the addition of another component to set up the suspension. For example, CARBOPOL TM 941 may be used without the addition of a neutralizing base. Viscosities in the range of from about 200 to about 50,000 cp, preferably in the range of from about 200 to about 10,000 cp, measured at the temperature of application may be used.

A variety of viscosity-increasing agents, which serve to stabilize the metal particulate suspension and also act as a binding agent when the liquid medium is removed by drying, may be used. Polyacrylic acid (available from B. F. Goodrich Chemical Company under the trade name CARBOPOL TM) is particularly desirable. In general, polyacrylic acids with molecular weights of from about 1,000,000 to about 4,000,000 are suitable. As previously noted, CARBOPOL TM 941 is particularly preferred. CARBOPOL TM 941 has a molecular weight of about 1,250,000. CARBOPOL TM 934 may also be used. It has a molecular weight of about 3,000,000. Other materials which can be used include carboxy methyl cellulose, carboxy ethyl cellulose, polyethylene oxide, sodium alginate, carboxy methyl cellulose, guar gum, methyl cellulose, and locust bean gum. In general, when water is used as the liquid medium, water compatible stabilizing/binding agents which volatilize and/or decompose substantially completely prior to or during sintering may be used.

The austenitic stainless steel porous articles in accordance with this invention are characterized by having low carbon residues, i.e., less than about 0.08 weight percent, more preferably less than about 0.05 percent, and typically 0.03 percent or less, e.g., 0.015 percent. Low product carbon content is due to the very low concentration of binder resin which, in turn, is made possible by tailoring the weight ratio of the metal particulate to carrier (stabilizing/binding agent and liquid medium) in the suspension. Typically, the amount of carbon present in the stabilized suspension by virtue of the stabilizing/binding agent is about 0.25 percent or less (based on the weight of the metal particulate). Part of this is lost during heat up in the sintering operation, and the residual quantity of carbon actually absorbed into the metal is reduced by chemical or physical processes which occur during sintering.

A low carbon content is particularly significant when working with austenitic stainless steels since austenitic stainless steels with carbon contents greater than 0.08 weight percent are susceptible to precipitation of chromium carbides at the grain boundaries which can cause corrosion under many conditions. This susceptibility to corrosion is exacerbated when austenitic stainless steel containing greater than 0.08 weight percent carbon has been exposed to a temperature in the range of from about 900° to about 1,500° F. (sensitization range). Typically, the lower the carbon content, the lower the susceptibility of the austenitic stainless steel to intergranular corrosion. Austenitic stainless steel having carbon contents in the range of from about 0.03 to about 0.08 weight percent are stable when they have not been subjected to a temperature in the sensitization range. However, when such steels are exposed to a temperature in the sensitization range, chromium carbides will precipitate at the grain boundaries and the metal then becomes susceptible to attack by various corrosive media. Austenitic stainless steels with carbon contents less than 0.03 weight percent will not precipitate significant amounts of chromium carbides at the grain boundaries even after they have been subjected to a temperature in the sensitization range, thus exhibiting a higher corrosion resistance than comparable austenitic stainless steels with carbon contents greater than 0.03 weight percent.

The process by which the carbon is removed during sintering from austenitic stainless steel porous articles is not fully understood. It has, however, been empirically determined that it is generally not economically practical to obtain products with less than about 0.015 to 0.08 percent of carbon if the starting mixture contains more than about 1 percent carbon. This is thought to be the case because, even if the carbonaceous binder melts and/or volatilizes, enough carbon is diffused into the metal from the liquid or vapor to undesirably increase its carbon content to levels well above 0.08 percent. For these reasons, the weight percent of the carbon in the stabilized suspension in the suspending medium to the weight of the particulate austenitic stainless steel should preferably be kept to less than about 0.25 percent of the weight of the metal particulate.

Substantially spherical particles provide a more tightly controlled pore size distribution uniformly distributed within the structure. Alternatively, various metal particulate morphology combinations can be employed in the stabilized suspension.

Agents which may be used to supply the binding function or to supplement the binding afforded by the stabilizing agent include sodium alginate, guar gum, and methyl cellulose.

The amount present should be balanced against the desire to have as little carbon content as possible in the dried compressed cake as it enters the sintering phase. Thus, if the stabilizing and binding functions are provided by different chemicals, it is preferred that the stabilizing agent used be one that, when used in effective amounts, results in the lowest residual carbon content in the cake entering the sintering furnace.

The amount of binding agent should normally not exceed 5% and generally from about 0.2 to about 1% by weight (based on the combined weights of the liquid and the binding agent) is suitable.

Pressure Filtration

The stabilized metal particulate suspension described above is then pressure filtered in a suitable device. Such a device would comprise a container, a filter means, a drainage means, and a pressure inducing means adapted to force the liquid medium and the bulk of the stabilizing/binding agent through the filter means leaving some of the liquid medium, the stabilizing/binding agent, and all of the metal particulate on the filter.

While it is preferred to increase the pressure in the container containing the liquid to enhance filtration, it is possible, as an alternative, or perhaps in addition, to filter into a zone of reduced pressure. In this way, the liquid medium is drawn through the filter medium as opposed to being only pushed through as would be the case if pressure inside the container were the sole driving force.

While many such devices can be envisaged, the present invention is further described with particular reference to the pressure filter illustrated in FIG. 1. In the drawing, a generally cylindrical pressurizable container 1 has a filter mechanism closing its lower open end which communicates with an outlet plenum 2 drained by a perforated tube 5. The filter structure comprises a lower layer of a perforated reinforcement plate 3 and positioned thereon a composite support mesh 4 comprising three 10×10 mesh screens and one 40×40 mesh screen and, seated upon said composite support mesh, a filter screen 6 of 400×400 mesh.

In a typical process according to the invention a stabilized suspension is introduced into the container, which is then closed and pressurized so as to give a pressure differential across the filter of at least about 10 psi, preferably from about 10 to about 100 psi, and most preferably from about 10 to about 30 psi. The suspension medium is filtered through the filter structure and collects in the outlet plenum from which it is drained through the perforated tube 5. The metal particulate is deposited on the filter screen 6.

After filtration is complete, the filter screen 6, with the wet cake of deposited particulate metal in place upon it, is removed and placed on a first flat metal plate.

The geometrical configuration of the filter on which the wet cake is collected is not critical and can be any planar shape such as round, square, ellipsoidal, and so on. All such configurations are referred to hereafter as "sheets".

Drying Wet Cake

When water/CARBOPOL TM is used as the liquid medium/stabilizing/binding agent mixture, the plate bearing the wet cake may conveniently be then placed in a circulating air or convection oven at from about 100° to about 200° F., such as about 150° F., for 4 to 6 hours to remove the water and to cure the binder. Other systems may require different drying temperatures and times. In this embodiment the dried cake is then removed from the oven and a second flat metal plate is placed on top of the dried cake. This structure is then inverted and the first metal plate (formerly the bottom plate) is removed, exposing the filter screen. This is then stripped from the cake leaving the dried cake on the second metal plate.

Compression of Dried Cake

As an alternative to the drying operation described above, or in addition thereto, the wet cake may be subjected to compression. This can be done to remove liquid from the wet cake, in which case it is preferably done at an elevated temperature as described above, or the dried cake resulting from a separate drying operation as described above can be compressed.

In either event, the cake in place upon the second metal plate is placed in a hydraulic press which, in one embodiment, is provided with parallel flat thickness spacers around the dried cake. These spacers act as "dead stops", preventing overcompression and precisely controlling thickness of the compressed cake. Compression is continued until the press reaches these dead stops. Alternatively and sometimes preferably, isostatic pressure can be used to compress the cake. In this event, a predetermined pressure is applied to the dried cake and the level is determined by the desired porosity of the final product.

It is found that compression prior to sintering has the effect of improving the ductility and the mechanical strength of the final filter while at the same time reducing pore size. Compression prior to sintering increases the number of points of contact and the area of contact between particles, resulting in a product of increased strength.

The amount of compression used will vary with the geometry and size of the particles used. In general, however, it should be sufficient to produce a voids volume in the final porous medium of from 40 to 70%, and preferably 45 to 60%.

Generally it is found sufficient to compress the dried cake to a thickness that is not less than about 50% and more preferably not less than about 60% of its pre-compression thickness. Expressed differently, the compression should usually result in a reduction of thickness of the pre-compression dried cake of not more than about 50% and preferably not less than about 40%.

In an alternative embodiment of the invention, the dried cake is sintered (see below) prior to compression. This also is effective in reducing the porosity of the filter sheet to a desired level. In such an embodiment isostatic pressure or compression to a desired thickness can be employed.

Sintering

The sintering step itself is preferably carried out at a temperature high enough to promote solid state diffusion of metal atoms from one particle to another to form the sintered bonds. For stainless steel metal particulate, a temperature in the range of from about 1,600° to about 2,500° F., more preferably from about 1,900° to about 2,375° F., for from about 0.5 to about 2 hours has been found adequate. Preferably the sintering step is carried out under a pure hydrogen or other reducing atmosphere or, more preferably still, in a vacuum.

When lower melting materials are used such as bronze, lower sintering temperatures may be used. For example, with bronze, temperatures in the range of from about 1,400° to about 1,900° F. are adequate.

While the sintering step is preferably carried out at a temperature high enough to promote solid state diffusion as noted above, it can also be carried out using liquid phase sintering at relatively lower temperatures, e.g., using silver with stainless steel particulate or tin with copper.

In addition to the method described above, it is possible to introduce minor elaborations without departing from the basic inventive concept. It is possible, for example, to perform the laydown of metal particulate in two or more stages by sequential pressure filtration of two or more different suspensions having different particle sizes or different morphologies. In this way, for example, the pore size of the final filter can be graded to provide a larger pore size at one face graduating in one or more steps to a finer pore size at the opposed face.

The filter mesh used in the pressure filtration operation is usually removed before sintering. This may be done directly before sintering or if desired before compression or drying. In an alternative embodiment the mesh may be left in place to provide added support or further filtering capacity.

It is also feasible to incorporate a fitting, which typically is a support structure such as a wire mesh, either on one or both faces of the filter or in the body of the filter. This can be done by placing the support mesh on top of the filter mesh, or by placing the support mesh in the desired position before compression. Where it is desired to locate the support mesh in the body of the filter, this may be done by forming the laydown in two separate stages and placing the support mesh on top of the laydown from the first stage and then subsequently laying down the second stage on top of the mesh.

The method of the invention is now described with specific reference to the following example, which is for the purpose of illustration only and is intended to imply no limitation on the essential scope of the invention.

EXAMPLE

A pressure vessel configured according to FIG. 1, having an inside diameter of 8.375 inches, is prepared with a 400×400 mesh laydown screen. Four liters of 1.15% CARBOPOL TM 934 solution (viscosity 300 to 500 cp) is measured out and 237 g of −200, +325 316B stainless steel metal powder is added under constant agitation. As used herein, this nomenclature, i.e., −200, +325 mesh, refers to the characteristics of the particulate material. In this specific instance, it passes through a 200 mesh U.S. standard sieve but does not pass through a 325 mesh U.S. standard sieve.

After the metal powder is homogeneously mixed (after about 3 minutes), the stabilized suspension is poured into the pressure vessel on top of the filter (or laydown) screen. The pressure vessel is sealed and then pressurized to 20 psi. The suspension medium is allowed to exit the housing via the drain. After about 30 seconds, all of the medium has drained from the housing and air is allowed to pass through the wet cake to remove excess moisture. This takes an additional 60 seconds.

The air flow is then turned off and the housing is disassembled. The net wet laydown thickness is approximately 0.093 inch thick. The laydown is transferred to a 0.022 inch thick stainless steel plate and then placed in a drying oven set at 150.F.

After 4 to 6 hours, the laydown is removed and a stainless steel plate is placed on top such that the laydown is sandwiched between two similar metal plates. The sandwich is then inverted and the lower metal plate (now the upper metal plate) is removed, exposing the 400×400 mesh screen. This is then stripped away leaving the dried laydown cake on the plate. This is then placed in a 500 ton press. Four 0.092 inch thick spaces are inserted around the laydown and the press is pressurized to 500 tons total force to compress the laydown to a uniform thickness of 0.070 inch. The spacers act as the final thickness gauge.

The laydown is removed from the stainless steel plate and placed on a refractory sheet. When a sufficient quantity of the laydowns have been placed on a furnace load, the load is placed into the sintering furnace and sintered for 8 hours at 2,250° F. under a 100 μm of Hg vacuum.

After sintering, the laydowns are removed and tested for permeability, bubble point (as hereinafter defined), thickness, and strength. The typical properties for a medium made by this process are: thickness, 0.067±0.001 inch; pressure drop across the filter at an air flow rate of 100 ft/min, 18.1±1.6 inches of water column; and void volume, 53%±1.5%.

Evaluation of the Products of the Invention

The best way to quantify the improvement in uniformity of the products prepared by the process of the invention is in the relationship of the pressure at the first bubble point and the pressure at selected flow rates.

Four filters were prepared. Two (A-1 and A-2) were made by the process of the invention as described above in the Example, and two (B-1 and B-2) were made from identical metallic particles but dry-laid, and then compressed, and sintered using similar procedures to those used for A-1 and A-2. The first bubble point pressure (in inches of water column, i.e., "inches $H_2O$") was measured for each as well as the pressure at two different flow rates. The results are set forth in Table 1 below.

The Bubble Point tests referred to in the examples below were carried out at ambient temperature by placing the filter sheet in a suitable testing jig and placing the sheet to be tested in a liquid bath of Filmex B (190 proof denatured ethyl alcohol available from Ashland Chemical Company) to wet out all the pores. Air pressure was then applied to one side of the sheet and the pressure required for the first or initial bubble of air to appear on the opposed or second surface of the sheet was recorded. The pressure was then increased until a flow rate of 20,000 cubic centimeters of air per minute per square foot of surface area was flowing through the structure. This pressure was then recorded. For all of the examples set out below, the distribution of bubbles on the second (downstream) surface of the sample tested at this point was observed to be quite uniform. After recording the pressure at this flow rate, the flow rate was increased to 60,000 cubic centimeters of air per minute per square foot of surface area and the pressure again recorded. The ratio of the pressure required to maintain the specified flow rates, i.e., 20,000 and 60,000, to the pressure required to form the initial bubble is a measure of the uniformity of pore size in the formed structure. That is, the closer the ratio is to 1.0, the more uniform the pore size and the tighter the pore size distribution. To eliminate the effect of the pressure drop of the structure itself on this ratio, the clean pressure drop (that is, in air with no wetting of the pores) at each of the specified air flow rates of 20,000 and 60,000 was measured and subtracted from the pressure drop measured at the corresponding flow rate when the sample was submerged in Filmex B prior to calculation of each of the ratios.

samples, A-3 and A-4 (according to the invention) and B-3 (a conventionally sintered filter).

The porous metal articles in accordance with this invention typically have F2 ratings at beta=100 (as hereinafter defined) of from about 1 to about 100 $\mu$m, preferably from about 5 to about 40 $\mu$m. The sintered structures in accordance with this invention have relatively high voids volume at a given efficiency relative to other sintered structures of this general type due to the uniformity of the formed structures in accordance with this invention and the relative absence of density variations.

The F2 test used in making pore size measurements is a modified version of the F2 test developed in the 1970's at Oklahoma State University (OSU). In the OSU test, a suspension of an artificial contaminant in an appropriate test fluid is passed through the test filter while continuously sampling the fluid upstream and downstream of the filter under test. The samples are analyzed by automatic particle counters for their contents of five or more preselected particle diameters and the ratio of the upstream to downstream count is automatically recorded. This ratio is known in the industry as the beta ratio ($\beta$).

The beta ratio for the diameters tested may be plotted as the ordinate against particle diameter as the abscissa, usually on a graph in which the ordinate is a logarithmic scale and the abscissa is a $\log^2$ scale A smooth curve is then drawn between the points. The beta ratio for any diameter within the range tested can then be read from this curve. Efficiency at a particular particle diameter is calculated from the beta ratio by the formula:

TABLE 1

| Example | Pressure at First Bubble Point (inches H$_2$O) | Pressure at 20,000 cc/min/ft$^2$ (inches H$_2$O) | Pressure at 60,000 cc/min/ft$^2$ (inches H$_2$O) | Ratio of Pressure at 60,000 to Pressure of First Bubble Point |
|---|---|---|---|---|
| A-1 | 15.0 | 16.2 | 18.4 | 1.08 at 20,000 |
|  |  |  |  | 1.23 at 60,000 |
| A-2 | 14.6 | 15.9 | 18.0 | 1.08 at 20,000 |
|  |  |  |  | 1.23 at 60,000 |
| B-1 | 11.3 | 14.7 | 17.0 | 1.30 at 20,000 |
|  |  |  |  | 1.50 at 60,000 |
| B-2 | 12.4 | 14.7 | 17.3 | 1.18 at 20,000 |
|  |  |  |  | 1.40 at 60,000 |

The ratios of the pressures at the specified flow rates, i.e., 20,000 and 60,000, to the pressure required to form the first or initial Bubble Point were below 1.3. These relatively low ratios reflect the substantially uniform pore structures of the porous articles prepared by the method in accordance with the invention. As used herein for purposes of describing the uniform pore characteristics of the porous articles in accordance with the invention, the term "Bubble Point ratio" refers to the ratio of the pressure required to maintain a flow rate of 60,000 cubic centimeters per square foot to the pressure required to form the first bubble of air to appear (as described in the test method set out above). The pressures are measured using the test method set out above, subtracting the clean pressure drop at a flow rate of 60,000 cubic centimeters of dry air per minute per square foot of surface area from the measured value prior to calculating the ratio In addition, the F2 data, which is a measure of pore size of a porous medium, was obtained for three other Efficiency, percent = 100 (1 − 1/beta)

As an example, if beta=100, efficiency=99%.

Unless otherwise stated, the removal rating cited in the examples presented herein is the particle diameters at which beta=100; hence, the efficiency at the removal rating cited is 99%.

In the modified F2 test, efficiencies in the range of from 1 to 20 $\mu$m were determined using as a test contaminant a suspension of AC fine test dust, a natural silicious dust supplied by the AC Spark Plug Company. Prior to use, a suspension of the dust in water was mixed until the dispersion was stable. Test flow rate was ten liters per minute per square foot of filter area. The results are shown in Table 2.

TABLE 2

| Example | F2 at $\beta_{10}$ ($\mu$m) | F2 at $\beta_{100}$ ($\mu$m) | F2 at $\beta_{1000}$ ($\mu$m) | F2 at $\beta_\infty$ ($\mu$m) | Dirt Capacity (gm) |
|---|---|---|---|---|---|
| A3 | 6.9 | 8.8 | 11.2 | 13.1 | 2.61 |
| A4 | 5.8 | 8.8 | 10.9 | 12.3 | 2.53 |

TABLE 2-continued

| Example | F2 at $\beta_{10}$ ($\mu$m) | F2 at $\beta_{100}$ ($\mu$m) | F2 at $\beta_{1000}$ ($\mu$m) | F2 at $\beta_\infty$ ($\mu$m) | Dirt Capacity (gm) |
|---|---|---|---|---|---|
| B-3* | 8.5 | 11.1 | 13.0 | 14.4 | 2.29 |

*Average of seven samples

As can be seen from the above data, the filters of the invention were superior to the prior art filters in dirt capacity, even at lower F2 ratings. In general, preferred filter sheets of the invention have an F2 rating at beta=100 of from about 1 to about 100 $\mu$m and preferably from about 5 to about 60 $\mu$m.

Similar filters with similar bubble point ratios and F2 ratings are obtained when isostatic compression is substituted for the "dead-stop" compression described in the Example, all other conditions remaining essentially unchanged.

In similar manner to preparation of Examples A-1 and A-2, ten (10) discs having nominal diameters of 7.5 inches (19.1 cm.) were prepared and the Bubble Point Ratio for each disc was determined with the results shown in Table 3 below.

TABLE 3

BUBBLE POINT RATIO FOR LIQUID LAYDOWN TEST AREA OF: 0.31 FT$^2$ (279 CM$^2$).

| EXAMPLE | PRESSURE AT BUBBLE POINT (in inches H$_2$O) | PRESSURE at 60,000 cc/min/ft$^2$ | BUBBLE POINT RATIO |
|---|---|---|---|
| C-1 | 15.0 | 15.2 | 1.01 |
| C-2 | 14.1 | 14.3 | 1.01 |
| C-3 | 14.7 | 14.9 | 1.01 |
| C-4 | 14.6 | 14.8 | 1.01 |
| C-5 | 15.2 | 15.4 | 1.01 |
| C-6 | 14.9 | 15.1 | 1.01 |
| C-7 | 14.6 | 15.4 | 1.05 |
| C-8 | 14.0 | 15.0 | 1.07 |
| C-9 | 14.0 | 15.4 | 1.10 |
| C-10 | 14.5 | 15.8 | 1.09 |

What is claimed is:

1. A method of making a porous metal filter sheet which comprises:
   (a) forming a stabilized suspension of a metal particulate in a liquid medium;
   (b) pressure filtering the stabilized suspension through a screen that is fine enough to retain substantially all of the particles so as to form a wet cake;
   (c) removing liquid from said wet cake to provide a dried cake with green strength; and
   (d) sintering the dried cake to fuse the metal particles and remove all volatile material.

2. A method according to claim 1 in which the dried cake is compressed prior to sintering.

3. A method according to claim 2 in which the dried cake is compressed to a predetermined thickness.

4. A method according to claim 1 in which liquid is removed from the wet cake by subjecting the wet cake to compression to give a dried cake.

5. A method according to claim 4 in which the compression of the wet cake is carried out at an elevated temperature.

6. A method according to claim 1 in which the sintered dried cake is subjected to compression to decrease the pore size of the resultant filter element.

7. A method according to claim 1 in which the filter screen is removed from the cake prior to sintering.

8. A method according to claim 1 in which the metal particulate is a stainless steel.

9. A method according to claim 1 in which the metal particulate has a particle size of from about 1 to about 300 $\mu$m.

10. A method according to claim 1 in which the liquid medium is water.

11. A method according to claim 1 in which the stabilized suspension contains a stabilizer agent that also acts as a binder to provide green strength upon formation of the dried cake.

12. A method according to claim 11 in which the stabilizer/binder is a polyacrylic acid having a molecular weight of from about 1,000,000 to about 4,000,000.

13. A method according to claim 12 in which the stabilizing/binding agent is used in an amount that is from about 0.1 to about 5 weight percent, based on the combined weights of the liquid medium and the stabilizing/binding agent.

14. A method according to claim 1 in which the weight ratio of metal particulate to liquid medium is in the range of from about 4:1 to about 0.01:1.

15. A method according to claim 1 in which the metal particulate is laid down in a plurality of layers as a result of a plurality of filtration operations and the particle size and/or morphology of the metal particulate used in each successive operation is changed by comparison with that used in the previous operation.

16. A method according to claim 1 in which the metal particulate is laid down in a plurality of layers as a result of a plurality of filtration operations and the particle size of the metal particulate used in each successive operation is changed by comparison with that used in the previous operation to give a graded pore structure in the direction of filtration.

17. A method according to claim 3 in which the dried cake is compressed prior to sintering to a predetermined thickness that is not less than about 50% of its precompression thickness.

18. A method of making a porous metal filter sheet which comprises:
   (a) forming a stabilized suspension comprising stainless steel particles having a particle size of from about 1 to about 75 $\mu$m dispersed in water in the presence of a stabilizing/binding agent which is a polyacrylic acid with a molecular weight of about 3,000,000 such that the weight ratio of the metal particulate to the liquid medium is in the range of from about 1:1 to about 0.025:1 and the stabilizing/binding agent is present in an amount that is from about 0.2 to about 1 weight percent, based on the combined weights of water and stabilizing/binding agent;
   (b) filtering the stabilized suspension under a pressure differential across the filter of from about 10 to about 30 psi through a screen that is fine enough to retain substantially all of the metal particles, so as to form a wet cake;
   (c) drying said wet cake at a temperature of from about 100° to about 200° F. so as to remove water and provide a dried cake with green strength;
   (d) removing the filter screen and compressing the dried cake to a predetermined thickness that is not less than about 60% of the precompression thickness; and (e) sintering the compressed dried cake at a temperature of from about 1,600 to about 2,500° F. so as to fuse the metal particles and remove all volatile material and form a porous metal filter sheet.

19. A porous metal filter sheet of substantially uniform pore structure comprising a non-spherical metal particulate in which the individual particles of said particulate are bonded to each other and said sheet has a Bubble Point ratio of about 1.2 or less at a flow rate of about 60,000 cc/min/ft$^2$, said filter sheet having a nominal surface area of at least 0.3 ft$^2$ or greater.

20. The porous metal filter sheet of claim 19 wherein said particulate is stainless steel.

21. The porous metal filter sheet of claim 20 wherein said sheet has an F2 rating at beta=100 of from about 1 to about 100 μm.

22. The porous metal filter sheet of claim 21 wherein said stainless steel is austenitic stainless steel.

23. The porous metal filter sheet of claim 19 wherein said sheet has a graded pore structure across its thickness.

24. The porous metal filter sheet of claim 23 wherein said sheet comprises a finer pored layer and a coarser pored layer.

25. The porous metal filter sheet of claim 24 wherein said finer layer is about 0.015 inch thick and said coarser layer is about 0.040 inch thick.

26. The porous metal filter sheet of claim 25 wherein said finer layer comprises metal particulate having a nominal particle size of about 1 to about 75 μm and said coarser layer comprises metal particulate having a nominal particle size of about 100 to about 300 μm.

27. The porous metal filter sheet of claim 19 wherein the sheet comprises a plurality of layers with at least one layer being formed from metal particulates having a morphology different from that of the particulate forming a contiguous layer.

28. The porous metal filter sheet of claim 19 having one or more fittings sinter-bonded to said sheet.

29. The porous metal filter sheet of claim 19 wherein said sheet has an F2 rating at beta=100 of from about 5 to about 60 μm.

30. A porous metal filter sheet made by a process according to claim 1.

31. A porous metal filter sheet made by a process according to claim 15.

32. A porous metal filter sheet made by a process according to claim 18.

33. The method of claim 1 wherein the metal particulate is non-spherical.

* * * * *